United States Patent
Harada (10) Patent No.: US 9,473,661 B2
(45) Date of Patent: Oct. 18, 2016

(54) IMAGE FORMING APPARATUS THAT DETERMINES EXECUTION ORDER OF PRINT JOBS BASED ON USER ARRIVAL TIMES AT THE IMAGE FORMING APPARATUS

(71) Applicant: KYOCERA Document Solutions Inc., Osaka-shi (JP)

(72) Inventor: Takashi Harada, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/806,318

(22) Filed: Jul. 22, 2015

(65) Prior Publication Data

US 2016/0028912 A1 Jan. 28, 2016

(30) Foreign Application Priority Data

Jul. 25, 2014 (JP) .................................. 2014-151382

(51) Int. Cl.
  *H04N 1/00* (2006.01)
  *G01S 19/24* (2010.01)
  *G01S 19/14* (2010.01)

(52) U.S. Cl.
  CPC ........... *H04N 1/00923* (2013.01); *G01S 19/14* (2013.01); *G01S 19/24* (2013.01); *H04N 1/00307* (2013.01); *H04N 1/00933* (2013.01)

(58) Field of Classification Search
  CPC .................................................. H04N 1/00923
  USPC ...................................... 358/1.15, 1.13, 1.14
  See application file for complete search history.

(56) References Cited

U.S. PATENT DOCUMENTS

2005/0243363 A1* 11/2005 Muto .................... G06F 3/1207
                                                                                358/1.15
2010/0315680 A1* 12/2010 Ishikake ............... G06F 3/1208
                                                                                358/1.15

(Continued)

FOREIGN PATENT DOCUMENTS

| JP | 2006-227795 A | 8/2006 |
| JP | 2007-049308 A | 2/2007 |

(Continued)

OTHER PUBLICATIONS

An Office Action; "Notice of Reasons for Rejection," issued by the Japanese Patent Office on Jun. 7, 2016, which corresponds to Japanese Patent Application No. 2014-151382 and is related to U.S. Appl. No. 14/806,318.

*Primary Examiner* — Jacky X Zheng
(74) *Attorney, Agent, or Firm* — Studebaker & Brackett PC (57) ABSTRACT

An image forming apparatus includes a receiving section, a distance acquiring section, an arrival time calculating section, an execution order determining section, and a printing section. The distance acquiring section acquires a distance between a user and the image forming apparatus. The arrival time calculating section calculates a travel speed of the user based on variation per unit time in the distance acquired by the distance acquiring section and calculates an arrival time indicating an amount of time it will take for the user to arrive at the image forming apparatus based on the calculated travel speed and the acquired distance. The execution order determining section determines, an order of execution of print jobs based on the arrival times calculated by the arrival time calculation section. The printing section then executes the print jobs in the execution order determined by the execution order determining section.

6 Claims, 8 Drawing Sheets

(56) References Cited

U.S. PATENT DOCUMENTS

| | | | |
|---|---|---|---|
| 2012/0212766 A1* | 8/2012 | Imamoto | G06F 3/122 358/1.14 |
| 2013/0242342 A1* | 9/2013 | Kawakami | G06Q 30/04 358/1.15 |
| 2014/0023383 A1* | 1/2014 | Kogusuri | G03G 15/553 399/8 |
| 2014/0355050 A1* | 12/2014 | Sakai | G06F 3/1204 358/1.15 |

FOREIGN PATENT DOCUMENTS

| | | |
|---|---|---|
| JP | 2007-148532 A | 6/2007 |
| JP | 2014-200915 A | 10/2014 |

* cited by examiner

IMAGE FORMING APPARATUS THAT DETERMINES EXECUTION ORDER OF PRINT JOBS BASED ON USER ARRIVAL TIMES AT THE IMAGE FORMING APPARATUS

INCORPORATION BY REFERENCE

The present application claims priority under 35 U.S.C. §119 to Japanese Patent Application No. 2014-151382, filed Jul. 25, 2014. The contents of this application are incorporated herein by reference in their entirety.

BACKGROUND

The present disclosure relates to image forming apparatuses and particularly relates to techniques for determining upon receipt of a plurality of print jobs, an order of execution of the print jobs.

A traditional image forming apparatus receives a plurality of print jobs input by a plurality of users and executes the print jobs in an order of receipt. However, a user near the image forming apparatus can arrive at the image forming apparatus shortly. Therefore, a print job that the user input may not be completed at the time when the user arrives at the image forming apparatus.

In order to obviate such a situation, a technique is discloses in which a distance between the image forming apparatus and each user is calculated according to the field intensity of radio waves emitted from respective mobile terminals that the users hold and an order of execution of a print job of a user located at the shortest calculated distance is advanced.

SUMMARY

An image forming apparatus according to one aspect of the present disclosure includes a receiving section, a distance acquiring section, an arrival time calculating section, an execution order determining section, and a printing section. The receiving section receives a print job input by a user. The distance acquiring section acquires a distance between a position of the user and a position of the image forming apparatus. The arrival time calculating section calculates a travel speed of the user based on variation pre unit time in the distance acquired by the distance acquiring section and calculates an arrival time indicating an amount of time it will take for the user to arrive at the image forming apparatus based on the calculated travel speed and the acquired distance. The execution order determining section determines an order of execution of a plurality of print jobs received by the receiving section according to the arrival times calculated by the arrival time calculation section. The printing section executes the print jobs in the order of execution determined by the execution determining section.

DETAILED DESCRIPTION

Figure 1:
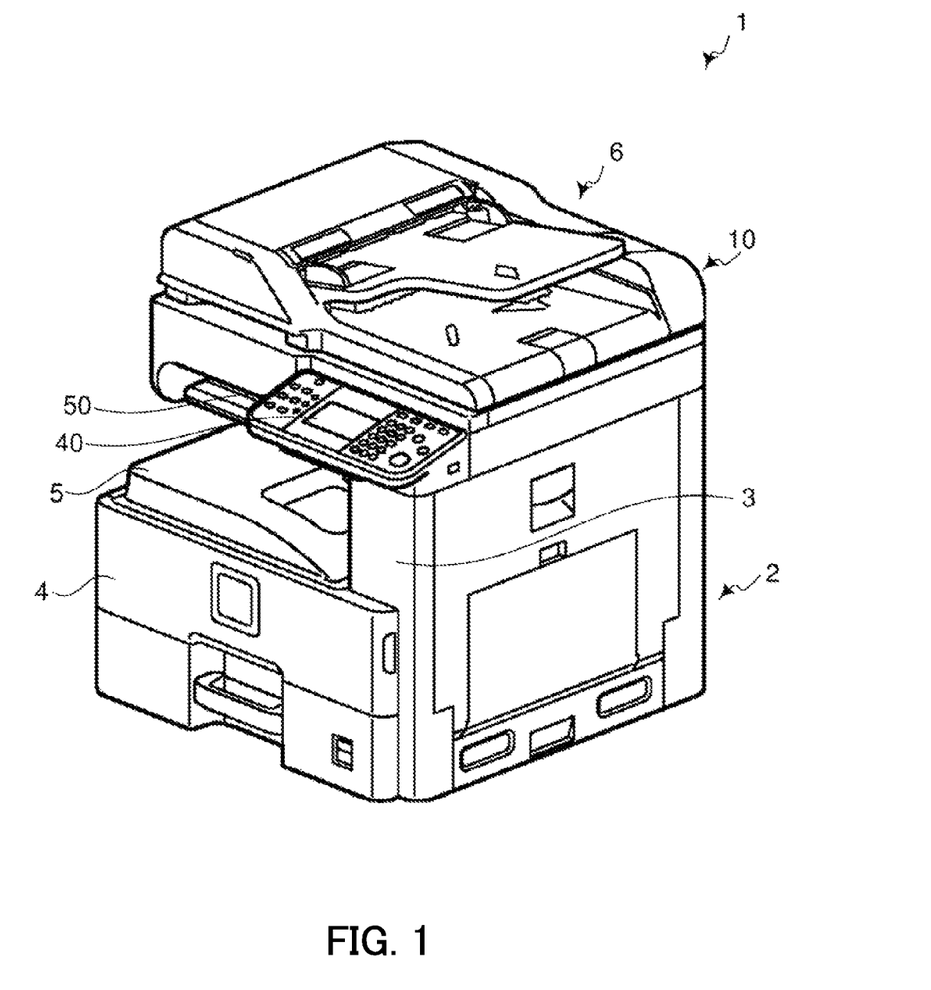
FIG. 1 is a perspective view illustrating an outer appearance of an image forming apparatus according to an embodiment of the present disclosure.
Figure 2:
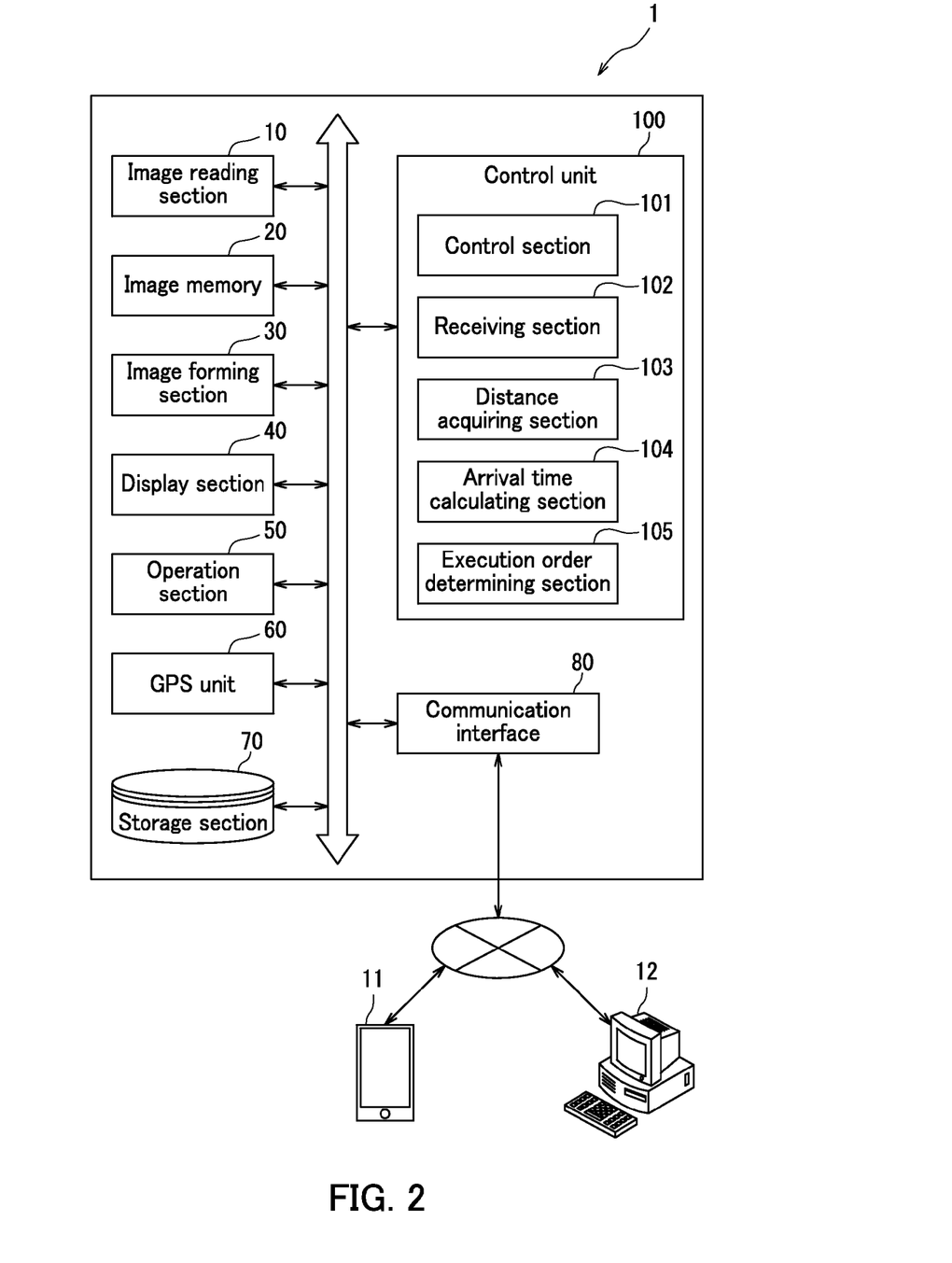
FIG. 2 is a block diagram illustrating an internal configuration of the image forming apparatus according to an embodiment of the present disclosure.

An image forming apparatus according to one embodiment of the present disclosure will be described below with reference to accompanying drawings. FIG. 1 is a perspective view illustrating an outer appearance of an image forming apparatus according to the embodiment of the present disclosure. FIG. 2 is a block diagram illustrating an internal configuration of the image forming apparatus according to the embodiment of the present disclosure.

An image forming apparatus 1 is a multifunction peripheral having a plurality of functions including a fax communication function, a copy function, a printing function, a scanning function, etc. As illustrated in FIG. 1, the image forming apparatus 1 includes a main body 2, an image reading section 10, and a joint section 3. The image reading section 10 is arranged above the main body 2. The joint section 3 is located between the image reading section 10 and the main body 2.

The image reading section 10 is an auto document feeder (ADF) including a document conveyance section 6 and a scanner. The scanner optically scans an original document conveyed by the document conveyance section 6 or an original document loaded on a contact glass (not illustrated).

An image memory 20 temporally stores to-be-printed data read by the image reading section 10. The image memory 20 further temporally stores to-be-printed data corresponding to a print job. The print job is transmitted from an information processing device (e.g., a mobile terminal 11 or a personal computer (PC) 12) and received by a communication interface 80, which will be described later.

An image forming section (a printing section) 30 reads out the to-be-printed data stored in the image memory 20 and forms (prints) an image onto paper fed from a paper feed section 4 based on the data. The paper having undergone printing is ejected onto an exit tray 5.

A display section 40 is disposed in the front of the image forming apparatus 1. The display section 40 includes a liquid crystal display (LCD) or an organic light emitting diode (OLED) display.

An operation section 50 includes a start key, a determination key (an enter key), numeric keys, etc., for example. Through the start key, starts of execution a print job and document reading are instructed. The determination key receives approval for a graphical user interface (GUI) constituting a menu screen displayed on the display section 40. The numeric keys receive input of numerals. The operation section 50 receives a user operation through the menu screen displayed on the display section 40.

A ground positioning system (GPS) unit 60 performs positioning using a GPS. The GPS unit 60 receives signals from a GPS satellite under control of a control section 101 of a control unit 100, which will be described later, to acquire a latitude and longitude of a position at which the image forming apparatus 1 is installed.

A storage section 70 is a mass storage device such as a hard disk drive (HDD). The storage section 70 stores the latitude and longitude of the position of the image forming apparatus 1 acquired through the GPS unit 60. The storage section 70 further stores print jobs received by a receiving section 102 of the control unit 100, which will be described later, and an order of execution of the print jobs.

The communication interface 80 includes a communication module such as a LAN chip (not illustrated). The image forming apparatus 1 is connected to one or more information processing devices (e.g., a mobile terminal 11 and a personal computer (PC) 12) via a network. The communication interface 80 transmits and receives data to and from the connected information processing devices under control of the control section 101, the receiving section 102, a distance acquiring section 103, etc. of the control unit 100, which will be described later.

The image forming apparatus 1 further includes the control unit 100. The control unit 100 includes a central processing unit (CPU), a random access memory (RAM), and a read only memory (ROM). The control unit 100 functions as the control section 101, the receiving section 102, the distance acquiring section 103, an arrival time calculating section 104, and an execution order determining section 105 in a manner that the CPU executes control programs stored in the ROM or the storage section 70. Note that the control section 101, the receiving section 102, the distance acquiring section 103, the arrival time calculating section 104, and the execution order determining section 105 may be configured by respective hardware circuits (i.e., dedicated electronic circuits) instead of implementation by the CPU executing the control programs.

The control section 101 governs overall operation control on the image forming apparatus 1. The control section 101 is connected to the image reading section 10, the image memory 20, the image forming section 30, the display section 40, the operation section 50, the GPS unit 60, the storage section 70, the communication interface 80, etc. to perform operation control on the respective connected elements and transmission and receipt of signals and data to and from the respective connected elements.

In particular, the control section 101 serves as a printing section through execution of a print job received by the receiving section 102. The printing section causes the image forming section 30 to form an image indicated in the print job onto paper. Upon the receiving section 102 receiving a plurality of print jobs, the control section 101 executes the print jobs in an order of execution determined by the execution order determining section 105.

The receiving section 102 transmits and receives data to and from the information processing devices (e.g., the mobile terminal 11 and the PC 12) via the communication interface 80. The receiving section 102 receives print jobs input by users through the information processing devices. The received print jobs are stored in the storage section 70.

The receiving section 102 further receives latitude and longitude information of a mobile terminal 11 that each of the users who inputs a corresponding one of the print jobs holds (carries). The mobile terminal 11 acquires the latitude and longitude information of the mobile terminal 11 using the GPS function.

In a situation in which a print job is input to the mobile terminal 11 having the GPS function, the mobile terminal 11 transmits the print job and the latitude and longitude information of the mobile terminal 11 to the image forming apparatus 1. The receiving section 102 receives the print job and the latitude and longitude information of the mobile terminal 11.

By contrast, in a situation in which a print job is input to an information processing device (e.g., the PC 12) that the user cannot carry, the information processing device transmits to the image forming apparatus 1 the print job and a media access control (MAC) address of a mobile terminal 11 that the user holds. The receiving section 102 performs communication with the mobile terminal 11 according to the transmitted MAC address and receives the latitude and longitude information of the mobile terminal 11. Note that although the foregoing describes an example in which the receiving section 102 receives a MAC address of a mobile terminal 11 together with a print job, information that the receiving section 102 receives is not limited to the MAC address. It is only required that information that the receiving section 102 receives is address information for identifying a mobile terminal 11 on the network.

The distance acquiring section 103 acquires a distance between the position of a user and the position of the image forming apparatus 1. The position of the user is a position at which the user who inputs a print job is located. The position of the image forming apparatus 1 is a position at which the image forming apparatus 1 is installed. Specifically, the distance acquiring section 103 acquires the latitude and longitude information received by the receiving section 102. The distance acquiring section 103 then calculates a distance between the position of the user and the position of the image forming apparatus 1 according to the acquired latitude and longitude information and the latitude and longitude information on the position of the image forming apparatus 1. The latitude and longitude information on the position of the image forming apparatus 1 is stored in the storage section 70.

The arrival time calculating section 104 calculates an arrival time indicating an amount of time it will take for the user to arrive at the image forming apparatus 1. Specifically, the arrival time calculating section 104 calculates variation in the distance per unit time acquired by the distance acquiring section 103 to calculate a travel speed of the user. The arrival time calculating section 104 then calculates an arrival time indicating an amount of time it will take for the user to arrive at the image forming apparatus 1 by dividing the distance acquired by the distance acquiring section 103 by the calculated travel speed. The arrival time calculated by the arrival time calculating section 104 is stored in the storage section 70.

Processing for distance calculation by the distance acquiring section 103 and processing for arrival time calculation by the arrival time calculating section 104 are executed at each predetermined time. For example, upon elapse of a predetermined time period from a time point when the processing for distance calculation and the processing for arrival time calculation are executed last, the distance acquiring section 103 re-performs the processing for distance calculation and the arrival time calculating section 104 re-performs the processing for arrival time calculation. Alternatively, the distance acquiring section 103 and the arrival time calculating section 104 may execute the processing for distance calculation and the processing for arrival time calculation, respectively, upon the receiving section 102 receiving a new print job, for example. Or, the distance acquiring section 103 and the arrival time calculating section 104 may re-perform the processing for distance calculation and the processing for arrival time calculation, respectively, upon the control section 101 starting or completing execution of a single print job. Note that the single print job means any one of print jobs received by the receiving section 102.

The execution order determining section 105 determines an order of execution of a plurality of print jobs received by the receiving section 102 according to arrival times calculated by the arrival time calculating section 104. Specifically, the execution order determining section 105 reads out an arrival time stored in the storage section 70 for each of the print jobs. The execution order determining section 105 then determines an order of execution of the print jobs to start from a print job for which a shortest arrival time is read. The order of execution determined by the execution order determining section 105 is stored in the storage section 70.

Figure 3:
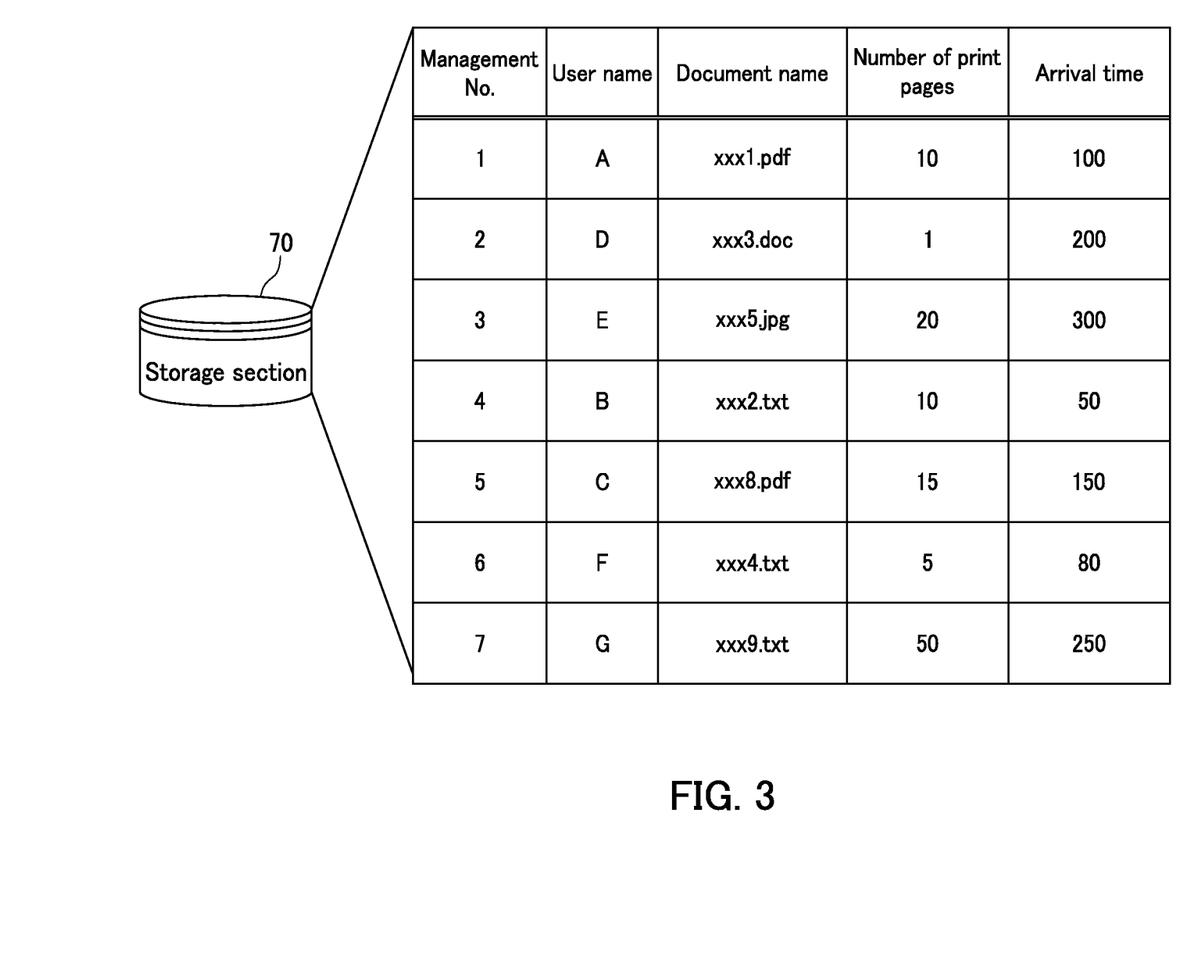
FIG. 3 illustrates an example of contents of information stored in a storage section of the image forming apparatus according to an embodiment of the present disclosure.

FIG. 3 illustrates an example of contents of information stored in the storage section 70. The storage section 70 stores information on a plurality of print jobs received by the receiving section 102. In the example illustrated in FIG. 3, the storage section 70 stores information indicating a user name, a document name, and the number of print pages for each of the print jobs. The user name is a name of a user that inputs a print job. The document name is a name of a document of to-be-printed data indicated in a print job. The number of print pages is indicated in a print job. In addition to the above information items, the storage section 70 stores an arrival time calculated by the arrival time calculating section 104 for each of the print jobs.

Figure 4:
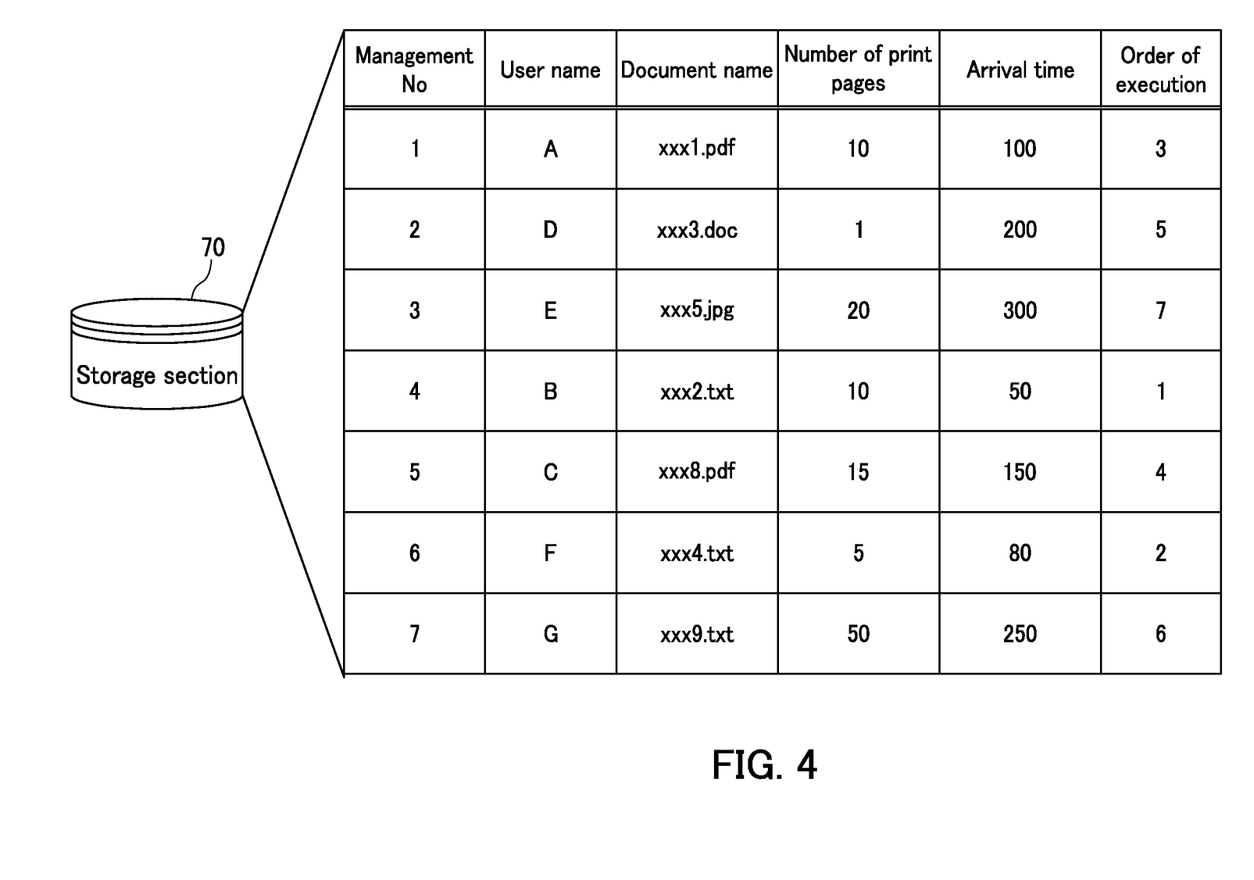
FIG. 4 illustrates an example of contents of information stored in the storage section after determination of an order of execution by an execution order determining section of the image forming apparatus according to an embodiment of the present disclosure.

FIG. 4 illustrates an example of contents of information stored in the storage section 70 after processing for execution order determination by the execution order determining section 105. The execution order determining section 105 determines an order of execution of print jobs by referencing the arrival time of each of the print jobs stored in the storage section 70. In the example illustrated in FIG. 4, a print job bearing a management number 4 is a print job for which a shortest arrival time is read. The execution order determining section 105 accordingly determines the print job bearing the management number 4 is executed first in the order of execution. A print job bearing a management number 6 is a print job for which a second shortest arrival time is read. The execution order determining section 105 accordingly determines the print job bearing the management number 6 as the second print job in the order of execution. In the above configuration, the print jobs are arranged in the order of arrival time starting from a print job of a user who will arrive at the image forming apparatus 1 the earliest, rather than the order of receipt by the receiving section 102. As a result, a possibility can be increased that the image forming apparatus 1 completes a print job input by a user until the user arrives at the image forming apparatus 1.

Figure 5:
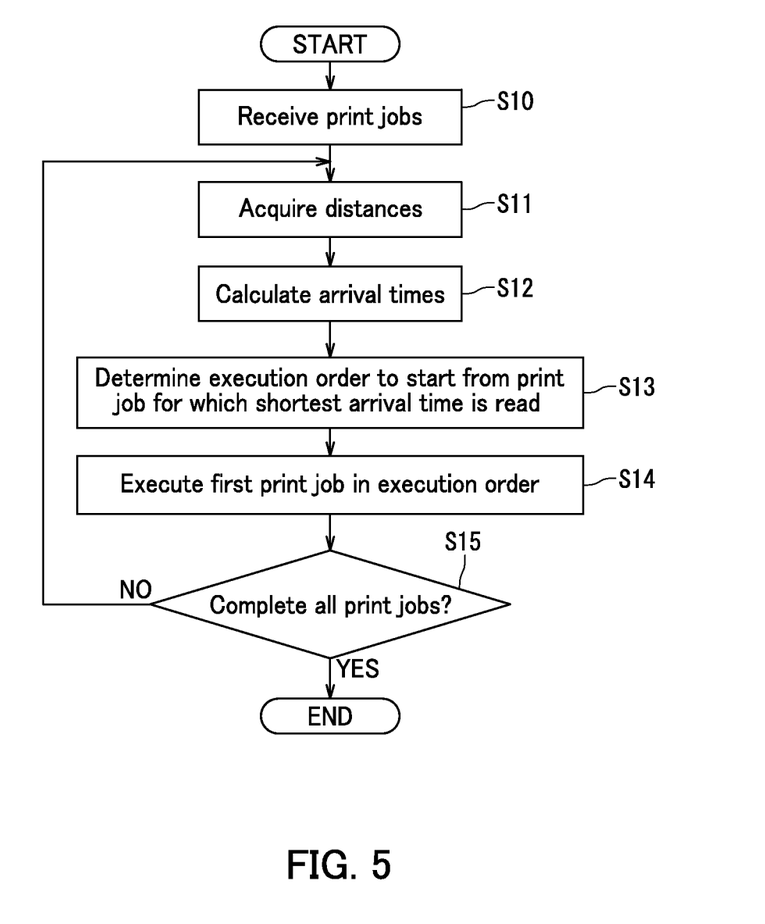
FIG. 5 is a flowchart depicting a flow of an operation performed by the image forming apparatus according to an embodiment of the present disclosure.

A specific flow of an operation performed by the image forming apparatus 1 will be described next. FIG. 5 is a flowchart depicting a flow of the operation performed by the image forming apparatus 1.

The receiving section 102 of the image forming apparatus 1 receives a plurality of print jobs (Step S10). Receiving a plurality of print jobs herein means a situation in which users each input a print job before one print job is completed and the print jobs that are unprocessed are accordingly accumulated in the image forming apparatus 1. The receiving section 102 causes the storage section 70 to store information on each of the received print jobs.

After Step S10, the distance acquiring section 103 acquires for each of the print jobs stored in the storage section 70, a distance between the position of a user who inputs the print job and the position of the image forming apparatus 1 (Step S11). The distance acquiring section 103 causes the storage section 70 to store the acquired distances. Note that although the above example describes the distance acquiring section 103 acquiring a distance for each of the print jobs stored in the storage section 70, the distance acquiring section 103 may acquire a distance for a print job of which information on a distance is not stored among the print jobs stored in the storage section 70.

After Step S11, the arrival time calculating section 104 calculates for each of the print jobs stored in the storage section 70, an arrival time indicating an amount of time it will take for a user who inputs the print job to arrive at the image forming apparatus 1 (Step S12). The arrival time calculating section 104 causes the storage section 70 to store the calculated arrival times. Note that although the arrival time calculating section 104 calculates an arrival time for each of the print jobs stored in the storage section 70 in the above example, the arrival time calculating section 104 may calculate an arrival time for a print job of which information on an arrival time is not stored among the print jobs stored in the storage section 70.

After Step S12, the execution order determining section 105 determines an order of execution of all of the print jobs stored in the storage section 70 to start from a print job for which a shortest arrival time is read.

After Step S13, the control section 101 causes execution of a first print job in the order of execution determined by the execution order determining section 105 (Step S14).

Subsequent to Step S14, the control section 101 determines whether or not execution of all of the print jobs stored in the storage section 70 is completed (Step S15). Upon determination that execution of not all of the print jobs is completed (No at Step S15), the routine returns to Step S11 so that the processing for distance calculation and the processing for arrival time calculation are re-performed and an order of execution of the print jobs are re-determined. By contrast, upon determination that execution of all of the print jobs is completed (Yes at step S15), the image forming apparatus 1 terminates print job execution.

Note that the image forming apparatus 1 re-performs distance calculation and arrival time calculation upon the control section 101 completing execution of one print job in the flowchart in FIG. 5, but may re-performs distance calculation and arrival time calculation with another predetermined timing as described above, such as timing with which the receiving section 102 receives a new print job.

As described so far, the image forming apparatus 1 includes the receiving section 102, the distance acquiring section 103, the arrival time calculating section 104, the execution order determining section 105, and the control section 101 (printing section). The control section 101 controls the image forming section 30 and the image forming operations performed by the image forming section 30. The receiving section 102 receives print jobs input by users. The distance acquiring section 103 acquires a distance between a position of each of the users and the position of the image forming apparatus 1. The arrival time calculating section 104 calculates a travel speed of each of the users based on variation per unit time in the distances acquired by the distance acquiring section 103. The arrival time calculating section 104 then calculates an arrival time indicating an amount of time it will take for each of the users to arrive at the image forming apparatus 1 based on the calculated travel speeds and distances. The execution order determining section 105 determines an order of execution of the print jobs received by the receiving section 102 based on the arrival times calculated by the arrival time calculating section 104. The printing section then executes the print jobs in the order of execution determined by the execution order determining section 105.

According to a certain technique to determine an order of execution of print jobs based on distances between users and an image forming apparatus, for example, a print job input by a user who is located near the image forming apparatus and who does not move from the user's position may be executed first in the order of execution. However, it may take long for such a user to arrive at the image forming apparatus. Accordingly, it is unnecessary to execute the print job of the user prior to the other print jobs. Further, for example, it is desirable that the image forming apparatus completes execution of a print job input by a user who is located far from the image forming apparatus and who rushes to the image forming apparatus before the user arrives at the image forming apparatus. In view of the foregoing, the image forming apparatus preferably executes the print job of the user prior to the other print jobs.

By contrast, in the configuration described as above, a travel speed of each user who inputs a print job is calculated based on variation in distance between the user and the image forming apparatus 1. An arrival time indicating an amount of time it will take for the user to arrive at the image forming apparatus 1 is calculated based on the distance and the travel speed. An order of execution of the print jobs is then determined based on the calculated arrival times. In the above configuration, a possibility can be increased that the image forming apparatus 1 completes a print job input by a user before the user arrives at the image forming apparatus 1.

In the image forming apparatus 1 as above, the distance acquiring section 103 acquires latitude and longitude information that a mobile terminal 11 held by a user acquires using the GPS function. The distance acquiring section 103 then calculates a distance between the user and the image forming apparatus 1 based on the acquired latitude and longitude information and latitude and longitude information on the position of the image forming apparatus 1.

The distance between the image forming apparatus and a user may be calculated based on the strength of the radio waves emitted from a mobile terminal held by the user. However, various things (obstacles) may be disposed in a space in which the image forming apparatus is installed. Therefore, the radio waves emitted from a mobile terminal may be attenuated by the obstacles. In such a situation, the distance between the user and the image forming apparatus 1 may be calculated inaccurately. By contrast, the image forming apparatus 1 acquires the latitude and longitude information that the mobile terminal 11 held by a user acquires using the GPS function. The latitude and longitude information acquired using the GPS function hardly receives influence of the obstacles disposed in the space in which the image forming apparatus 1 is installed. Thus, the distance between the user and the image forming apparatus 1 can be calculated accurately.

Further, the receiving section 102 of the image forming apparatus 1 receives from the mobile terminal 11 that the user holds, a print job and latitude and longitude information that the mobile terminal 11 acquires using the GPS function.

When a print job is input to the mobile terminal 11 that a user holds, the image forming apparatus 1 in the above configuration can acquire latitude and longitude information of the mobile terminal 11 through receipt of the print job transmitted from the mobile terminal 11.

Moreover, the receiving section 102 of the image forming apparatus 1 acquires from an information processing device such as the PC 12, a print job and a MAC address (address information) used for identifying on the network the mobile terminal 11 held by a user. The receiving section 102 then performs communication with the mobile terminal 11 according to the MAC address to receive the latitude and longitude information that the mobile terminal 11 acquires using the GPS function.

In the above configuration, in a situation in which a print job is input to an information processing device such as the PC 12 that a user cannot carry, the image forming apparatus 1 can acquire latitude and longitude information on the position of a user who input the print job.

Note that various alteration of the present disclosure can be made in addition to the configuration in the above embodiment.

<First Variation>

In an image forming apparatus 1 according to a first variation, an execution order determining section 105 determines an order of execution of print jobs based on the numbers of print pages in addition to arrival times. The arrival times are calculated by an arrival time calculating section 104. The numbers of print pages are each indicated in a corresponding one of print jobs received by the receiving section 102.

Figure 6:
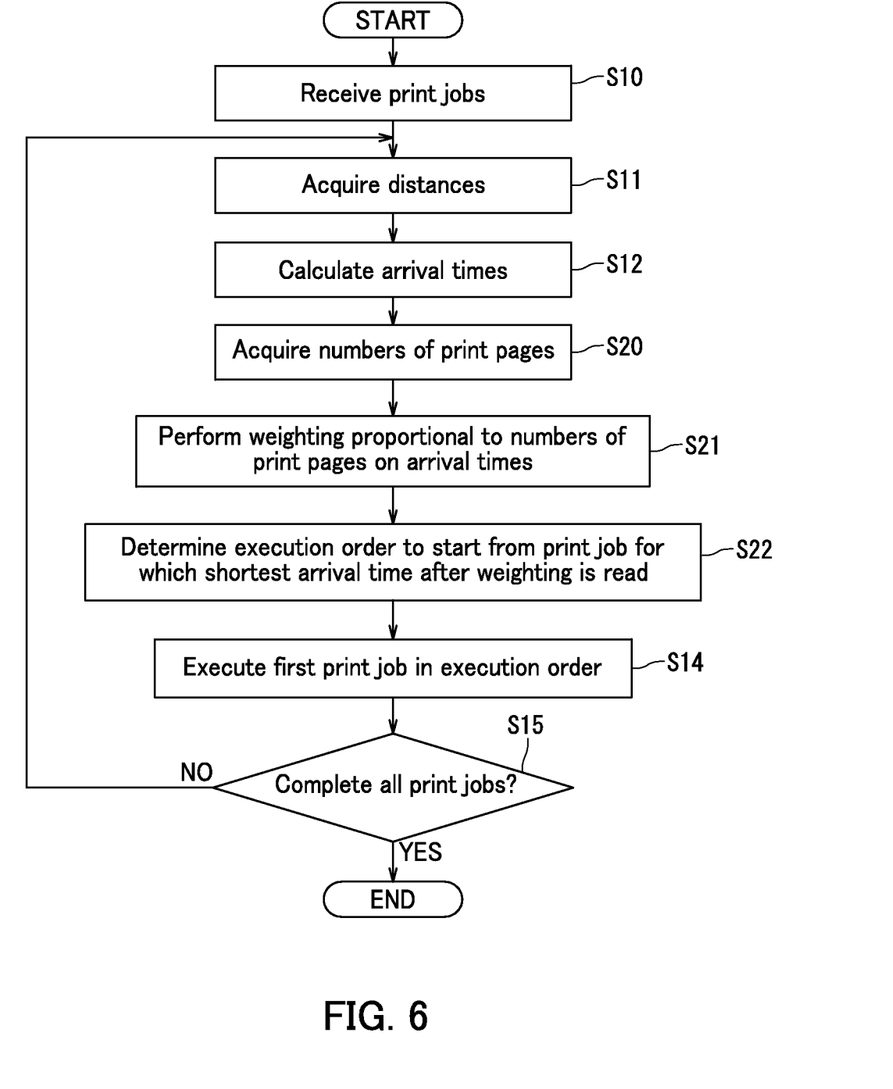
FIG. 6 is a flowchart depicting a flow of an operation performed by an image forming apparatus according to a first variation of the present disclosure.

FIG. 6 is a flowchart depicting a flow of an operation performed by the image forming apparatus 1 according to the first variation. Note that like numerals denote like processes in FIG. 5 and duplicate description shall be omitted.

After the processing for arrival time calculation at Step S12, an execution order determining section 105 acquires from a storage section 70, information representing the numbers of print pages indicated in respective print job received by the receiving section 102 (Step S20).

The execution order determining section 105 then performs weighting on the arrival times read for the respective print jobs stored in the storage section 70 according to the respective numbers of print pages acquired at Step S20 (Step S21). Specifically, the execution order determining section 105 multiplies the arrival time of each of the print jobs by a weighting coefficient. The weighting coefficient is a value not smaller than 1 and determined proportional to each number of print pages. The weighting coefficient increases as the number of print pages increases.

Subsequent to Step S21, the execution order determining section 105 determines an order of execution of the print jobs to start from a print job for which a shortest arrival time after the weighting is read (Step S22).

The control section 101 then executes a first print job in the order of execution determined by the execution order determining section 105 (Step S14).

Even when a print job indicating a larger number of print pages is advanced in the order of execution, the print job is more likely not to be completed at the time when the user arrives at the image forming apparatus 1 than a print job indicating a smaller number of print pages. In view of the foregoing, a print job indicating a larger number of print pages is multiplied by a larger weighting coefficient and a print job indicating a smaller number of print pages is multiplied by a weighting coefficient smaller than the weighting coefficient used in multiplication of the print job indicating the larger number of print pages. As a result, a possibility can be increased that the image forming apparatus 1 completes a print job input by a user before the user arrives at the image forming apparatus 1.

<Second Variation>

In an image forming apparatus 1 according to a second variation, an execution order determining section 105 determines an order of execution of print jobs based on the number of printable pages in addition to the arrival times and the numbers of print pages. The arrival times are calculated by an arrival time calculating section 104. The numbers of print pages each are indicated in a corresponding one of print jobs received by the receiving section 102. The number of printable page is a maximum number of pages printable by the image forming section 30.

Figure 7:
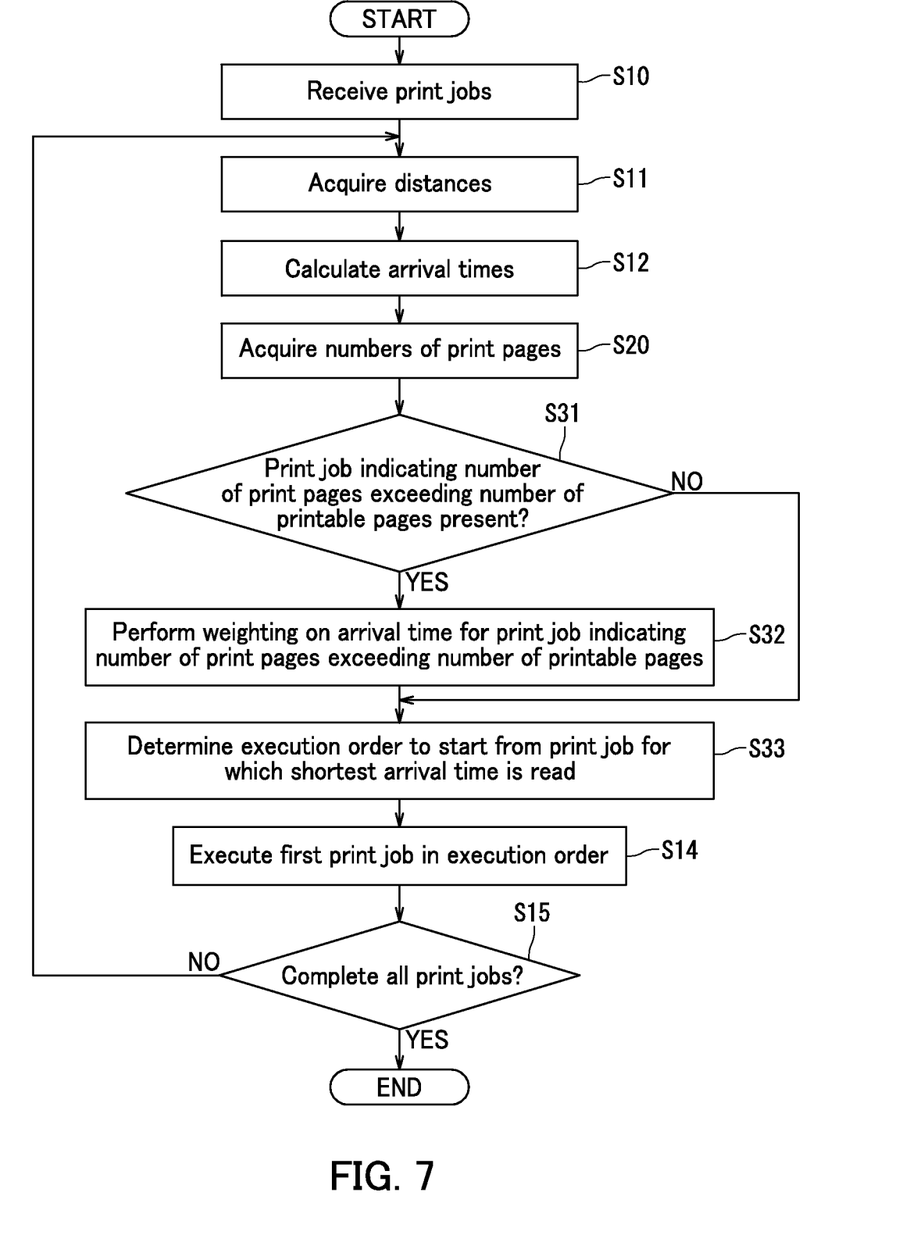
FIG. 7 is a flowchart depicting a flow of an operation performed by an image forming apparatus according to a second variation of the present disclosure.

FIG. 7 is a flowchart depicting a flow of an operation performed by an image forming apparatus 1 according to the second variation. Note that like numerals denote like processes in FIGS. 5 and 6 and repeated description shall be omitted.

After the numbers of print pages are acquired at Step S20, an execution order determining section 105 determines whether or not a print job indicating a number of print pages exceeding the number of printable pages is present among the print jobs received at Step S10 (Step S31). The execution order determining section 105 calculates the number of printable pages based on an amount of remaining toner contained in a toner container (not illustrated).

Upon determining that a print job indicating a number of print pages exceeding the number of printable pages is present (YES at Step S31), the execution order determining section 105 performs weighting on the arrival time calculated for the print job (Step S32). The print job is a print job indicating a number of print pages exceeding the number of printable pages. Specifically, the execution order determining section 105 multiplies the arrival time calculated for the print job by a predetermined weighting coefficient not smaller than 1.

By contrast, upon determining that a print job indicating a number of print pages exceeding the number of printable pages is not present (NO at Step S31), the routine proceeds to Step S33 directly without execution of weighting by the execution order determining section 105 at Step S32.

After Step S31 or S32, the execution order determining section 105 determines an order of execution of the print jobs to start from a print job for which a shortest arrival time is read (Step S33).

The control section 101 then executes the first print job in the order of execution determined by the execution order determining section 105 (Step S14).

The image forming apparatus cannot not compete a print job indicating a number of print pages exceeding the number of printable pages even when the order is changed to advance the print job. In view of the foregoing, a print job indicating a number of print pages exceeding the number of printable pages is multiplied by a weighting coefficient not smaller than 1. While on the other hand, a print job indicating a number of print pages not exceeding the number of printable pages is not multiplied by the weighting coefficient. In the above configuration, a possibility can be increased that the image forming apparatus 1 can complete a print job before a user who inputs the print job arrives at the image forming apparatus 1.

Note that in a situation in which a print job indicating a number of print pages exceeding the number of printable pages is present, the receiving section 102 may receive user selection as to whether or not to execute the print job by an image forming apparatuses different from the image forming apparatus 1 (hereinafter referred to as an image forming apparatus 1a). In this case, the control section 101 serves as a transmission destination specifying section. The transmission destination specifying section selects the image forming apparatus 1a capable of executing the print job among a plurality of image forming apparatuses connected to the image forming apparatus 1. For example, in a situation in which a print job involves color printing, the control section 101 selects an image forming apparatus capable of performing color printing. Further, the control section 101 selects an image forming apparatus that accommodates toner of which amount is sufficient for printing by the number of print pages indicated in the print job.

In a situation in which the receiving section 102 receives selection indicating that an image forming apparatus 1a is to execute the print job, the control section 101 (transmitting section) transmits the print job to the image forming apparatus 1a via the communication interface 80. In so doing, the control section 101 transmits to the image forming apparatus 1a the print job and latitude and longitude information of a mobile terminal 11 held by a user who inputs the print job. The image forming apparatus 1a receives the print job and the latitude and longitude information of the mobile terminal 11. The image forming apparatus 1a then performs processing for distance acquisition, processing for arrival time calculation, and processing for execution order determination for the print jobs based on the received latitude and longitude information. The image forming apparatus 1a then executes the print jobs in the determined order of execution.

Alternatively, the image forming apparatus 1 rather than the image forming apparatus 1a may execute the above distance acquirement, arrival time calculation, and execution order determination for the print jobs, and then transmit the determined order of execution of the print jobs together with the print jobs to the image forming apparatus 1a. In the above configuration, the storage section 70 stores the latitude and longitude information on the position of the image forming apparatus 1a in advance. The distance acquiring section 103 calculates a distance between each of the users and the image forming apparatus 1a based on the latitude and longitude information on the position of the image forming apparatus 1a and the latitude and longitude information of a mobile terminal 11 held by each of the users. The arrival time calculating section 104 calculates variation in each distance per unit time acquired by the distance acquiring section 103 to calculate a travel speed of each of the users. The execution order determining section 105 determines an order of execution of the print jobs based on the arrival times calculated by the arrival time calculating section 104. The determined order of execution is transmitted to the image forming apparatus 1a. The image forming apparatus 1a then executes the print jobs in the determined order of execution transmitted from the image forming apparatus 1.

As described above, the order of execution of the print jobs is determined by the image forming apparatus 1 rather than the image forming apparatus 1a. In the above configuration, even in a situation in which the image forming apparatus 1a is a general image forming apparatus not having functions for distance acquisition, arrival time calculation, and execution order determination for print jobs as described in the above embodiment, a user who inputs a print job can be prevented from experiencing a situation in which the print job is not completed when the user arrives at the image forming apparatus 1a.

Note that in a situation in which the order of execution of print jobs is changed in response to change in a user's travel speed calculated by the arrival time calculating section 104 after the order of execution is once transmitted to the image forming apparatus 1a, the changed order of execution may be transmitted again to the image forming apparatus 1a.

Furthermore, in a situation in which a plurality of image forming apparatuses that are different from the image forming apparatus 1 and to which print jobs are to be transmitted are present (e.g., in a situation in which print jobs are transmitted to the image forming apparatuses 1a and 1b), distance acquisition, arrival time calculation, and execution order determination for print jobs are performed for the image forming apparatuses 1a and 1b.

<Third Variation>

In an image forming apparatus 1 according to a third variation, a receiving section 102 receives from a user a print job and a corresponding setting as to whether or not the user immediately goes to the image forming apparatus 1 for paper printed according to the print job. An execution order determining section 105 then determines the order of execution such that a print job received together with a setting indicating that the user who inputs the print job does not immediately go there is executed last.

Figure 8:
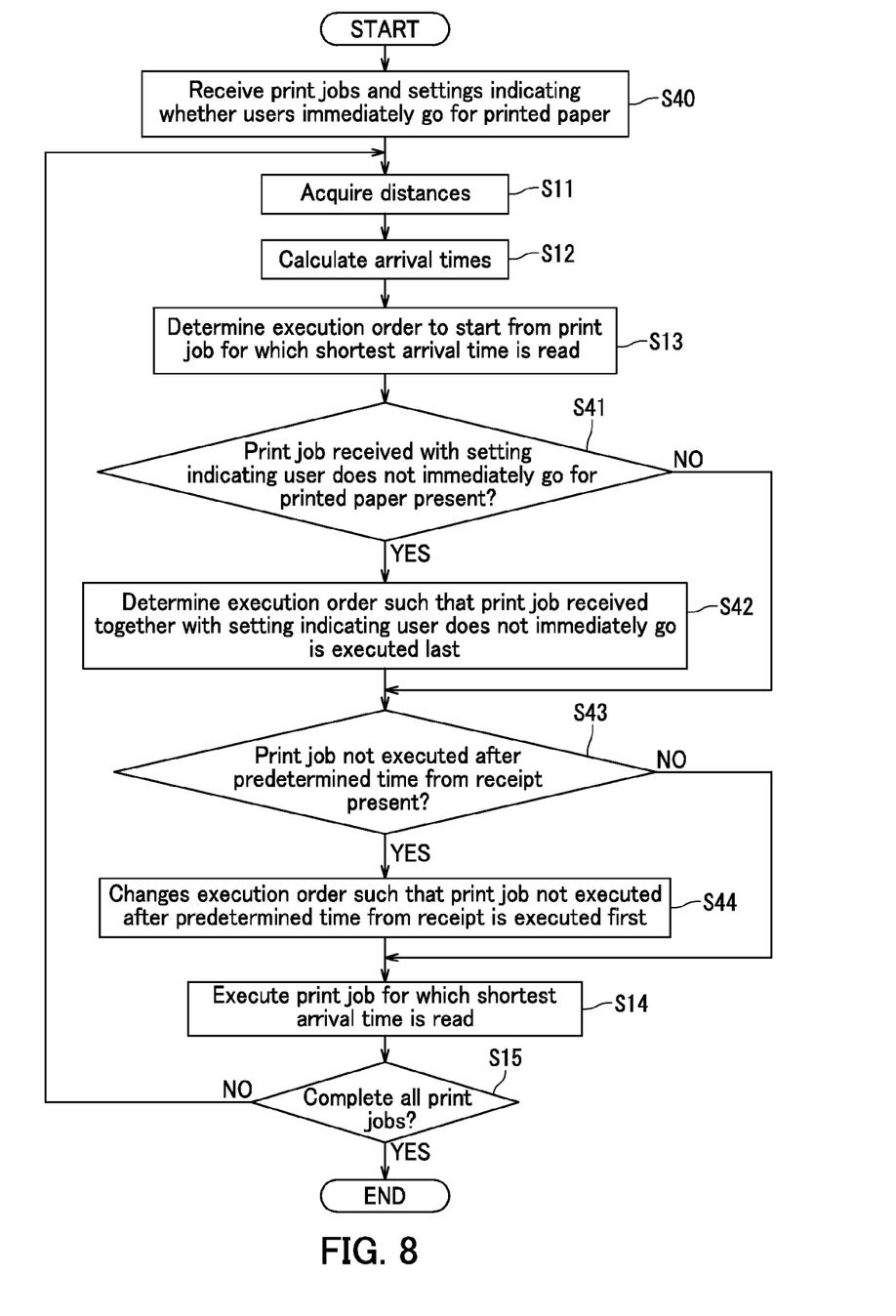
FIG. 8 is a flowchart depicting a flow of an operation performed by an image forming apparatus according to a third variation of the present disclosure.

FIG. 8 is a flowchart depicting a flow of an operation performed by the image forming apparatus 1 according to the third variation. Note that the same numerals denote the same processes in FIG. 5 and repeated description shall be omitted.

The receiving section 102 first receives from a plurality of users a plurality of print jobs and corresponding settings as to whether or not the respective users immediately go there for printed paper (Step S40). The printed paper is paper subjected to printing according to a print job.

Subsequent to Steps S11-S13 for distance acquisition, arrival time calculation, and execution order determination, the execution order determining section 105 determines whether or not a print job received together with a setting indicating that a user who inputs the print job does not immediately go there for the printed paper is present (Step S41).

Upon determining that a print job is present that is received together with the setting indicating that the user does not immediately go there for printed paper (YES at Step S41), the execution order determining section 105 changes the order of execution such that the print job is executed last (Step S42).

By contrast, upon determining that a print job is not present that is received together with the setting indicating that the user does not immediately go there for printed paper (NO at Step S41), the execution order determining section 105 does not perform execution order change on the print job at Step S42. That is, the routine skips to Step S43.

At Step S43, the execution order determining section 105 determines whether or not a print job is present that is not yet executed even after elapse of a predetermined time from receipt thereof by the receiving section 102.

Upon determining that a print job is present that is not yet executed even after elapse of the predetermined time from receipt thereof by the receiving section 102 (YES at Step S43), the execution order determining section 105 changes the order of execution such that the unexecuted print job is executed first (Step S44).

By contrast, upon determining that no print job is present that is not yet executed even after elapse of the predetermined time from receipt thereof by the receiving section 102 (NO at Step S43), the execution order determining section 105 does not execute execution order change on the print job at Step S44. That is, the routine skips to Step S14.

Subsequent to Step S43 or Step S44, the control section 101 executes the first print job in the order of execution determined by the execution order determining section 105 (Step S14).

It is needless to advance in the order of execution a print job received together with the setting indicating that the corresponding user does not immediately go there for printed paper after input of the print job. In view of the foregoing, the image forming apparatus 1 in the third variation receives from each user a print job and a corresponding setting as to whether or not the user immediately go there for printed paper. The order of execution is changed such that a print job received together with the setting indicating that the corresponding user who inputs the print job does not immediately go there for printed paper is executed last. In the above configuration, a possibility can be increased that the image forming apparatus 1 completes a print job before a user who inputs the print job arrives at the image forming apparatus.

In a situation in which the order of execution of print jobs is changed, some print job may not be executed even after a long period of time elapses after input of the print job. In view of the foregoing, the image forming apparatus 1 according to the third variation changes the order of execution such that a print job that is not yet executed even after a predetermined period of time elapses from receipt of the print job is executed first. The above configuration can prevent a print job from not being executed even after a long period of time elapses after input of the print job.

<Another Variations>

Any combinations among the above embodiment and the above variations are possible.

The control programs mentioned in the above embodiment may be stored in a computer-readable nonvolatile storage medium such as a hard disk, a CD-ROM, a DVD-ROM, or a semiconductor memory. In this case, the computer-readable nonvolatile storage medium that stores the control programs serves as one embodiment of the present disclosure.

What is claimed is:

1. An image forming apparatus comprising:
  a receiving section configured to receive a print job input by a user;
  a distance acquiring section configured to acquire a distance between a position of the user and a position of the image forming apparatus;
  an arrival time calculating section configured to calculate a travel speed of the user based on variation per unit time in the distance acquired by the distance acquiring section and to calculate an arrival time indicating an amount of time it will take for the user to arrive at the image forming apparatus based on the calculated travel speed and the acquired distance;
  a printing section configured to execute the print job received by the receiving section; and
  an execution order determining section configured to determine an order of execution of a plurality of print jobs received by the receiving section according to arrival times calculated by the arrival time calculating section,
  wherein
  in a situation in which the number of print pages indicated in at least one of the print jobs exceeds the number of printable pages that is a maximum number of pages printable by the printing section, the execution order determining section multiplies an arrival time read for the print job by a weighting coefficient and determines the order of execution to start from a print job for which a shortest arrival time after the weighting is read, and the printing section executes the print jobs in the order of execution determined by the execution order determining section.

2. The image forming apparatus according to claim 1, wherein the distance acquiring section acquires latitude and longitude information that a mobile terminal held by the user acquires using a GPS function, and acquires the distance between the position of the user and the position of the image forming apparatus through calculation based on the acquired latitude and longitude information and latitude and longitude information on a position at which the image forming apparatus is installed.

3. The image forming apparatus according to claim 2, wherein the receiving section receives from the mobile terminal held by the user, the print job and the latitude and longitude information that the mobile terminal acquires using the GPS function, and the distance acquiring section acquires the latitude and longitude information received by the receiving section.

4. The image forming apparatus according to claim 2, wherein the receiving section acquires from an information processing device, the print job and address information for identifying the mobile terminal held by the user on a network, performs communication with the mobile terminal based on the address information, and receives the latitude and longitude information that the mobile terminal acquires using the GPS function, and the distance acquiring section acquires the latitude and longitude information received by the receiving section.

5. The image forming apparatus according to claim 1, wherein the receiving section receives together with a print job, a setting indicating whether or not a user who inputs the print job immediately goes to the image forming apparatus for paper printed according to the print job, and the execution order determining section changes the order of execution such that the print job received together with a setting indicating that the user does not immediately go to the image forming apparatus for the printed paper is executed last.

6. The image forming apparatus according to claim 1, wherein in a situation in which a print job is present that is not yet executed even after elapse of a predetermined time from receipt thereof by the receiving section, the execution order determining section changes the order of execution such that the unexecuted print job is executed first.

* * * * *